United States Patent
Shi et al.

(10) Patent No.: US 11,523,359 B2
(45) Date of Patent: Dec. 6, 2022

(54) METHOD FOR MONITORING RADIO LINK AND TERMINAL DEVICE

(71) Applicant: GUANGDONG OPPO MOBILE TELECOMMUNICATIONS CORP., LTD., Guangdong (CN)

(72) Inventors: Zhihua Shi, Guangdong (CN); Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 94 days.

(21) Appl. No.: 17/142,211

(22) Filed: Jan. 5, 2021

(65) Prior Publication Data
US 2021/0127345 A1    Apr. 29, 2021

Related U.S. Application Data

(63) Continuation of application No. PCT/CN2018/095324, filed on Jul. 11, 2018.

(51) Int. Cl.
| | |
|---|---|
| *H04W 56/00* | (2009.01) |
| *H04L 1/16* | (2006.01) |
| *H04W 24/08* | (2009.01) |
| *H04W 74/08* | (2009.01) |

(52) U.S. Cl.
CPC ....... *H04W 56/0045* (2013.01); *H04L 1/1657* (2013.01); *H04W 24/08* (2013.01); *H04W 56/001* (2013.01); *H04W 74/0808* (2013.01)

(58) Field of Classification Search
None
See application file for complete search history.

(56) References Cited

U.S. PATENT DOCUMENTS

2021/0092623 A1*    3/2021    Wu ................... H04W 56/0015

FOREIGN PATENT DOCUMENTS

| CN | 102149217 | 8/2011 |
|---|---|---|
| CN | 105898686 | 8/2016 |
| WO | 2018083624 | 5/2018 |

OTHER PUBLICATIONS

"3rd Generation Partnership Project; Technical Specification Group Radio Access Network; NR; Radio Resource Control (RRC) protocol specification (Release 15)," 3GPP TS 38.331, Jun. 2018, v15.2.0, 304 pages.

"3rd Generation Partnership Project; Technical Specification Group Radio Access Network; NR; Radio Resource Control (RRC) protocol specification (Release 15)," 3GPP TS 36.213, Jun. 2018, v15.2.0, 540 pages.

(Continued)

*Primary Examiner* — Saad Khawar
(74) *Attorney, Agent, or Firm* — Hodgson Russ LLP

(57) ABSTRACT

The present application discloses a method and a terminal device for wireless link monitoring. The method includes: starting, by a terminal device, a timer T310, when a number of out of sync (OOS) indications continuously received by the terminal device exceeds a first number N310; and determining, by the terminal device, whether to stop the timer T310 before the timer T310 expires, according to a number of in sync (IS) indications received after the timer T310 is started or according to a proportional relation between the IS indication and the OOS indication received after the timer T310 is started.

16 Claims, 3 Drawing Sheets

(56) References Cited

OTHER PUBLICATIONS

"3rd Generation Partnership Project; Technical Specification Group Radio Access Network; NR; Physical layer procedures for control (Release 15)," 3GPP TS 38.213, Jun. 2018, V15.2.0, 98 pages.
WIPO, ISR for PCT/CN2018/095324, dated Mar. 6, 2019.
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 386.331, Jun. 2018, V15.2.0, 791 pages.
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331, Jun. 2018, V15.2.2, 791 pages.
EPO, Extended European Search Report for EP Application No. 18925988.0, dated May 31, 2021.

* cited by examiner

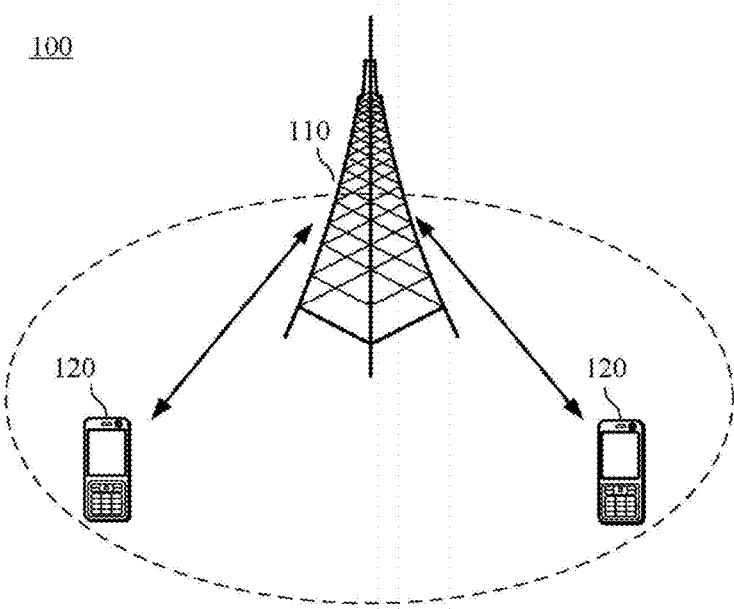

FIG. 1

Starting, by a terminal device, a timer T310, when the terminal device determines that a number of OOS indications continuously received exceeds a first number N310 — 210

Determining, by the terminal device, whether to stop the timer T310 before the timer T310 expires, according to a number of in sync (IS) indications received after the timer T310 is started or according to a proportional relation between the IS indication and the OOS indication received after the timer T310 is started — 220

FIG. 2

METHOD FOR MONITORING RADIO LINK AND TERMINAL DEVICE

CROSS-REFERENCE TO RELATED APPLICATIONS

The present application is a continuation of International Application No. PCT/CN2018/095324, filed on Jul. 11, 2018, the entire disclosure of which is hereby incorporated by reference.

TECHNICAL FIELD

Embodiments of the present disclosure relate to the field of communication, and more specifically, to a method and a terminal device for radio link monitoring (RLM).

BACKGROUND

Data transmission on unlicensed frequency bands is supported by the new radio (NR) system (or 5G system, 5G network). When a communication device communicates on the unlicensed spectrum, it needs to follow a listen before talk (LBT) principle. For example, before a base station sends a signal to the terminal device on the unlicensed spectrum, it needs to detect a channel first, and can send the signal only when the channel detection result is idle. If the result that the base station detects the channel on the unlicensed spectrum is busy, the signal cannot be sent.

The terminal device may receive a reference signal sent by the base station on the unlicensed spectrum for wireless link monitoring. When a quality of the reference signal measured by the terminal device is poor, the terminal device cannot know whether this is caused by that the base station can not transmit the reference signal because the channel is busy, or that a quality of the channel of the terminal device is poor. In this case, an actual channel condition can not be determined accurately by a RLM measurement result based on the reference signal.

SUMMARY

In a first aspect, there is provided a method for wireless link monitoring, including: starting, by a terminal device, a timer T310, when the terminal device determines that a number of out of sync (OOS) indications continuously received exceeds a first number N310; and determining, by the terminal device, whether to stop the timer T310 before the timer T310 expires, according to a number of in sync (IS) indications received after the timer T310 is started or according to a proportional relation between the IS indication and the OOS indication received after the timer T310 is started.

In a second aspect, there is provided a method for wireless link monitoring, including: starting, by a terminal device, a timer T310, when a number of out of sync (OOS) indications continuously received by the terminal device exceeds a first number N310; and determining, by the terminal device, whether a radio link failure (RLF) occurs when the timer T310 expires, according to a number of in sync (IS) indications received after the timer T310 is started or according to a proportional relation between the IS indication and the OOS indication received after the timer T310 is started.

In a third aspect, there is provided a terminal device, which may execute the method according to the above first aspect or any possible embodiment thereof. Specifically, the terminal device may include a function module, which is configured to execute the method according to the above first aspect or any possible embodiment thereof.

In a fourth aspect, there is provided a terminal device, which may execute the method according to the above second aspect or any possible embodiment thereof. Specifically, the terminal device may include a function module, which is configured to execute the method according to the above second aspect or any possible embodiment thereof.

In a fifth aspect, there is provided a terminal device including a processor and a memory. The memory is configured to store computer programs, and the processor is configured to call and run the computer programs stored in the memory to execute the method according to the above first aspect or any possible embodiment thereof.

In a sixth aspect, there is provided a terminal device including a processor and a memory. The memory is configured to store computer programs, and the processor is configured to call and run the computer programs stored in the memory to execute the method according to the above second aspect or any possible embodiment thereof.

In a seventh aspect, there is provided a chip, which is configured to implement the method according to the above first aspect or any possible embodiment thereof. Specifically, the chip includes a processor, and the processor is configured to call and run computer programs from a memory, so that a device installed with the chip executes the method according to the above first aspect or any possible embodiment thereof.

In an eighth aspect, there is provided a chip, which is configured to implement the method according to the above second aspect or any possible embodiment thereof. Specifically, the chip includes a processor, and the processor is configured to call and run computer programs from a memory, so that a device installed with the chip executes the method according to the above second aspect or any possible embodiment thereof.

In a ninth aspect, there is provided a computer-readable storage medium, which is configured to store computer programs that cause a computer to execute the method according to the above first aspect or any possible embodiment thereof.

In a tenth aspect, there is provided a computer-readable storage medium, which is configured to store computer programs that cause a computer to execute the method according to the above second aspect or any possible embodiment thereof.

In an eleventh aspect, there is provided a computer program product, including computer program instructions that cause a computer to execute the method according to the above first aspect or any possible embodiment thereof.

In a twelfth aspect, there is provided a computer program product, including computer program instructions that cause a computer to execute the method according to the above second aspect or any possible embodiment thereof.

In a thirteenth aspect, there is provided a computer program, that when running in a computer, causes the computer to execute the method according to the above first aspect or any possible embodiment thereof.

In a fourteenth aspect, there is provided a computer program, that when running in a computer, causes the computer to execute the method according to the above second aspect or any possible embodiment thereof.

In a fifteenth aspect, there is provided a computer program, that when running in a computer, causes the computer to execute the method according to the above first aspect or any possible embodiment thereof.

In a sixteenth aspect, there is provided a computer program, that when running in a computer, causes the computer to execute the method according to the above second aspect or any possible embodiment thereof.

BRIEF DESCRIPTION OF THE DRAWINGS

FIG. 1 is a schematic diagram of a possible wireless communication system applied in an embodiment of the present application.

FIG. 2 is a schematic flowchart of a method for wireless link monitoring according to an embodiment of the present application.

DETAILED DESCRIPTION

Figure 3:
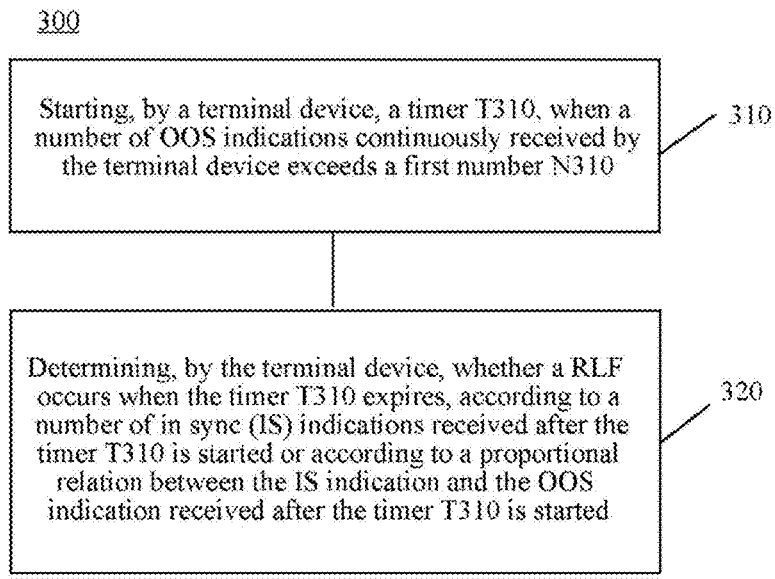
FIG. 3 is a schematic flowchart of a method for wireless link monitoring according to another embodiment of the present application.

The technical solution in embodiments of the present application will be described below in conjunction with the drawings in the embodiments of the present application. Obviously, the described embodiments are part of the embodiments of the present application, rather than all of the embodiments thereof. Based on the embodiments in the present application, all other embodiments obtained by those skilled in the art without creative work shall fall within the protection scope of the present application.

The technical solution of the embodiments of the present application may be applied to various communication systems, such as a global system of mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), advanced long term evolution (LTE-A) system, new radio (NR) system, NR system evolution system, LTE-based access to unlicensed spectrum (LTE-U) system, NR-based access to unlicensed spectrum (NR-U) system, universal mobile telecommunication system (UMTS), worldwide interoperability for microwave access (WiMAX) communication system, wireless local area networks (WLAN), wireless fidelity (WiFi), next-generation communication system or other communication systems, and the like.

Generally, a traditional communication system supports a limited number of connections and is easy to be implemented. However, with the development of communication technology, a mobile communication system will not only support traditional communication, but also support, for example, device to device (D2D) communication, machine to machine (M2M) communication, machine type communication (MTC), and vehicle to vehicle (V2V) communication and the like. The embodiments of the present application may also be applied to these communication systems.

Optionally, the communication system in the embodiments of the present application may be applied to a carrier aggregation (CA) scenario, may also be applied to a dual connectivity (DC) scenario, and may further be applied to a standalone (SA) network deployment scenario.

Exemplarily, a communication system 100 applied in an embodiment of the present application is shown in FIG. 1. The wireless communication system 100 may include a network device 110. The network device 110 may be a device that communicates with a terminal device. The network device 110 may provide communication coverage for a specific geographic area, and may communicate with the terminal device located in the coverage area. Optionally, the network device 100 may be a base station (base transceiver station, BTS) in a GSM system or a CDMA system, or a base station (NodeB, NB) in a WCDMA system, or an evolutional base station (evolutional Node B, eNB or eNodeB) in an LTE system, or a network side device in a NR system, or a wireless controller in a cloud radio access network (CRAN), or the network device may be a relay station, access point, in-vehicle device, wearable device, network side device in the next-generation network, or network device in a future evolutional public land mobile network (PLMN), and the like.

The wireless communication system 100 further includes at least one terminal device 120 located within the coverage area of the network device 110. As used herein, the "terminal device" includes, but is not limited to, connections via a wired line, such as a public switched telephone network (PSTN), digital subscriber line (DSL), digital cable, and direct cable connections; and/or another data connection/network; and/or a wireless interface, for example, for a cellular network, wireless local area network (WLAN), digital TV network such as DVB-H network, satellite network, AM-FM broadcast transmitter; and/or a device of another terminal device configured to receive/send communication signal; and/or an Internet of Things (IoT) device. A terminal device configured to communicate through a wireless interface may be referred to as a "wireless communication terminal", "wireless terminal" or "mobile terminal".

The terminal device 120 may be mobile or fixed. Optionally, the terminal device 120 may refer to an access terminal, user equipment (UE), user unit, user station, mobile radio station, mobile station, remote station, remote terminal, mobile device, user terminal, terminal, wireless communication device, user agent or user device. The access terminal may be a cellular phone, cordless phone, session initiation protocol (SIP) phone, wireless local loop (WLL) station, personal digital assistant (PDA), handheld device with wireless communication function, computing device, or other processing devices connected to a wireless modem, in-vehicle device, wearable device, terminal device in the future 5G network or terminal device in the future-evolutional PLMN, and the like. Optionally, there may be device to device (D2D) communication between the terminal devices 120.

Specifically, the network device 110 may provide a service for a cell, and the terminal device 120 communicates with the network device 110 through a transmission resource (for example, a frequency domain resource, or a spectrum resource) used by the cell. The cell may be a cell to which the network device 110 (for example, a base station) corresponds. The cell may belong to a macro base station or belong to a base station corresponding to a small cell. The small cell herein may include: a metro cell, micro cell, pico cell, femto cell and the like. These small cells have characteristics such as small coverage and low transmit power, and are suitable for providing a high-rate data transmission service.

FIG. 1 exemplarily shows one network device and two terminal devices. Optionally, the wireless communication system 100 may include a plurality of network devices, and the coverage of each network device may include other numbers of terminal devices, which is not limited in the embodiment of the present application.

Optionally, the wireless communication system 100 may further include other network entities such as a network controller and a mobility management entity, which is not limited in the embodiment of the present application.

Currently, target scenarios in the NR-based access to unlicensed spectrum (NR-U) system include a SA scenario and a DC scenario, in both of which an RLM operation should be performed on the unlicensed spectrum. Before sending a signal over the unlicensed spectrum, the network device needs to detect a channel to determine whether the channel is idle, and only when it is determined that the channel is idle, can send the signal. Therefore, when the network device sends a reference signal RLM-RS for wireless link monitoring to the terminal device, the RLM-RS may not be sent due to a busy channel, thereby affecting the wireless link monitoring of the terminal device.

In an existing mechanism, the terminal device performs measurement based on the RLM-RS to obtain a signal to interference plus noise ratio (SINR). When the SINR is higher than an in-sync threshold Qin, the terminal device reports an in-sync (IS) indication, and when the measured SINR is lower than an out-of-sync threshold Qout, the terminal device reports an out-of-sync (OOS) indication.

However, with respect to the unlicensed spectrum, when the SINR measured by the terminal device is very low, the terminal device can not know whether this is caused by that the network device can not transmit the RLM-RS since the channel is busy, or that a quality of the channel of the terminal device is poor. If the channel is temporarily busy when the network device is sending the RLM-RS and thus the RLM-RS can not be sent, but in fact, once the channel is idle, the channel quality is still good, the terminal device can not determine a current actual channel condition according to the measurement result of the RLM-RS.

Therefore, an embodiment of the present application proposes that when the terminal device performs wireless link monitoring, after the timer T310 is started, the terminal device may determine whether to stop the timer T310 in advance according to the number of the received IS indications or according to a proportional relation between the IS indication and the OOS indication, so as to avoid, as much as possible, a misjudgment of a RLF caused by that the RLM-RS cannot be successfully sent due to a busy channel, thereby improving an accuracy of RLM measurement on unlicensed spectrum.

In an embodiment of the present application, the reference signal RLM-RS for radio link monitoring performed by the terminal device may include, for example, a channel state information reference signal (CSI-RS), a synchronization signal block (SSB or SS Block) or the like.

FIG. 2 is a schematic flowchart of a method 200 for wireless link monitoring according to an embodiment of the present application. The method described in FIG. 2 may be executed by a terminal device, and the terminal device may be, for example, the terminal device 120 shown in FIG. 1. As shown in FIG. 2, the method 200 for wireless link monitoring may include some or all of the following steps:

at 210, starting, by a terminal device, a timer T310, when a number of out of sync (OOS) indications continuously received by the terminal device exceeds a first number N310; and at 220, determining, by the terminal device, whether to stop the timer T310 before the timer T310 expires, according to a number of in sync (IS) indications received after the timer T310 is started or according to a proportional relation between the IS indication and the OOS indication received after the timer T310 is started.

The timer T310 is configured for the terminal device to determine whether an RLF occurs. When a higher layer of the terminal device receives a number of N310 of the OOS indications continuously sent by a physical layer, the timer T310 may started. Before the timer T310 expires, if the higher layer of the terminal device receives a number of N311 of the IS indications continuously sent by the physical layer, the timer T310 may be stopped.

At present, for a cell with radio link monitoring, if a measured value of signal quality of the terminal device is higher than an in-sync threshold Qin, the physical layer of the terminal device may report an in sync (IS) indication to the higher layer; on the contrary, if the measured value of the signal quality of the terminal device is lower than the out-of-sync threshold Qout, the physical layer of the terminal device reports an out of sync (OOS) indication to the higher layer. If the higher layer of the terminal device receives a number of N310 of continuous OOS indications from the physical layer (it is assumed herein that other timers such as a timer T311 are not running, and only the RLM under the timer T310 mechanism is considered herein), the timer T310 is started. When the higher layer of the terminal device receives a number of N311 of the continuous IS indications from the physical layer and the timer T310 is running (that is, the timer T310 has not expired), the timer T310 is stopped. Moreover, in the existing solution, if the higher layer of the terminal device does not receive the number of N311 of continuous IS indications before the timer T310 expires, the terminal device considers that the RLF occurs.

In the embodiment of the present application, if before the timer T310 expires, the higher layer of the terminal device may determine whether to stop the timer N310 according to the number of the IS indications received or according to the proportional relation between the IS indication and the OOS indication, so that the timer T310 is stopped under an appropriate condition, to avoid a misjudgment of the RLF caused by an excessive number of the OSS indications due to the busy channel and thus the failure to send the RLM-RS.

In the embodiment of the present application, the terminal device may determine whether to stop the timer T310 according to the proportional relation between the IS indication and the OOS indication, or may determine whether to stop the timer T310 according to the number of the IS indications discontinuously received. The two manners are described respectively below.

Manner 1

Optionally, determining, by the terminal device, whether to stop the timer T310 according to the proportional relation between the IS indication and the OOS indication received after the timer T310 is started in 220 includes:

stopping, by the terminal device, the timer T310, if a ratio of the number of the IS indications to the number of the OOS indications is greater than or equal to a first threshold; and/or stopping, by the terminal device, the timer T310, if a ratio of the number of the IS indications to a total number of the IS indications and the OOS indications is greater than or equal to a second threshold; and/or stopping, by the terminal device, the timer T310, if a ratio of the number of the OOS indications to the number of the IS indications is less than or equal to a third threshold; and/or stopping, by the terminal device, the timer T310, if a ratio of the number of the OOS indications to the total number of the IS indications and the OOS indications is less than or equal to a fourth threshold.

In the embodiment, the proportional relation between the IS indication and the OOS indication may be represented by any of the following: the ratio of the number of the IS indications to the number of the OOS indications, the ratio of the number of the IS indications to the total number of the IS indications and the OOS indications, the ratio of the number of the OOS indications to the number of the IS indications, or the ratio of the number of the OOS indications to the total number of the IS indications and the OOS indications.

It can be seen that as long as the number of the IS indications received by the terminal device reaches a certain proportion, the terminal device may stop the timer T310, otherwise, does not stop the timer T310. Specifically, the terminal device may perform statistics on the proportion of the IS indication based on the method described below.

Optionally, determining, by the terminal device, whether to stop the timer T310 according to the proportional relation between the IS indication and the OOS indication received after the timer T310 is started, includes: determining, by the terminal device, whether the total number of the IS indications and the OOS indications reaches a fifth threshold; and determining, by the terminal device, whether to stop the timer T310 according to the proportional relation between the IS indication and the OOS indication, if the total number of the IS indications and the OOS indications reaches the fifth threshold.

That is, when the number of samples collected by the terminal device (for example, the total number of the IS indications and the OOS indications) reaches the fifth threshold, the terminal device calculates the proportional relation between the IS indication and the OOS indication, and determines whether to stop the timer T310 according to the proportional relation.

It should be understood that the number of samples described herein may be the total number of the IS indications and the OOS indications, or the number of the IS indications, or the number of the OSS indications. Herein, only that the number of samples is the total number of the IS indications and the OOS indications is taken as an example for description, but the present application is not limited thereto.

Optionally, determining, by the terminal device, whether to stop the timer T310 according to the proportional relation between the IS indication and the OOS indication received after the timer T310 is started, includes: determining, by the terminal device, whether a running time of the timer T310 reaches a predetermined time duration; and determining, by the terminal device, whether to stop the timer T310 according to the proportional relation between the IS indication and the OOS indication, If the running time of the timer T310 reaches the predetermined time duration.

For example, the terminal device may start to determine whether to stop the timer T310 after the timer T310 runs for a certain time duration. The predetermined time duration may be configured by the network device for the terminal device, or may be pre-arranged by a protocol. Optionally, the predetermined time duration may be less than or equal to T-Toffset, wherein T is a set time duration of the timer T310, and Toffset is a minimum time duration required for the terminal device to stop the timer T310.

Optionally, determining, by the terminal device, whether to stop the timer T310 according to the proportional relation between the IS indication and the OOS indication received after the timer T310 is started, includes: updating, by the terminal device, the number of the IS indications and the number of the OOS indications received after the timer T310 is started, based on a time duration, and determining whether to stop the timer T310 according to an updated proportional relation between the IS indication and the OOS indication.

For example, every time a time duration T1 has passed, the terminal device updates the number of the IS indications and the number of the OOS indications received after the timer T310 is started.

Specifically, the terminal device may update the number of samples every time the time duration T1 has passed. The updated number of the IS indications herein refers to the number of all the IS indications received between the start of the timer T310 and the updating time point, and the updated number of the OOS indications herein refers to the number of all the OOS indications received between the start of the timer T310 and the updating time point. That is, every time the terminal device updates the number of the IS indications and the number of the OOS indications, the numbers of the IS indications and the OOS indications previously received are not cleared. Therefore, the total number of samples for calculating the proportion between the IS indication and OOS indication each time is constantly increased.

For example, it is assumed that the proportional relation between the IS indication and the OOS indication is the ratio between the number of the IS indications and the number of the OOS indications, and the terminal device stops the timer T310 when the ratio exceeds 2. If when a first time duration T1 has passed after the timer T310 is started, the terminal device receives 5 IS indications and 5 OOS indications, since 5/5<2, the timer T310 is not stopped. If when a second time duration T1 has passed, the terminal newly receives 9 IS indications and 1 OOS indication, the updated number of samples is: 14 IS indications and 6 OOS indications. Since the ratio of the number of the IS indications to the number of the OOS indications is 14/6>2, the terminal device may stop the timer T310.

Optionally, determining, by the terminal device, whether to stop the timer T310 according to the proportional relation between the IS indication and the OOS indication received after the timer T310 is started, includes: updating, by the terminal device, the number of the IS indications and the number of the OOS indications received after the timer T310 is started, based on the IS indication and the OOS indication, and determining whether to stop the timer T310 according to an updated proportional relation between the IS indication and the OOS indication.

For example, every time a number of M of the IS indications and the OOS indications are received newly, the terminal device updates the numbers of the IS indications and the OOS indications received after the timer T310 is started, where M is a positive integer.

Specifically, the terminal device may update the number of the IS indications and the number of the OOS indications every time when the number of M of the IS indications and the OOS indications are received newly, that is, whenever the number of the received IS and OOS indications reaches M. The updated number of the IS indications herein refers to the number of all the IS indications received between the start of the timer T310 and the updating time point, and the updated number of the OOS indications herein refers to the number of all the OOS indications received between the start of the timer T310 and the updating time point. That is, every time the terminal device updates the number of the IS indications and the number of the OOS indications, the numbers of the IS indications and the OOS indications previously received are not cleared. Therefore, the total number of samples for calculating the ratio of the IS indication and the OOS indication is constantly increased.

For example, it is assumed that the proportional relation between the IS indication and the OOS indication is the ratio between the number of the IS indications and the total number of the IS indications and the OOS indications, the terminal device stops the timer T310 when the ratio exceeds 0.6, and M=10. When the total number of the IS indications and the OSS indications received after the timer T310 is started reaches 10, the terminal device determines the ratio of the number of the IS indications and the total number of 10, and supposing that the number of the IS indications received is 6 and the number of the OOS indications is 4, since 6/10<0.6, the timer T310 is not stopped. Therefore, the terminal device continues to update the number of samples and determine whether to stop the timer T310. When the total number of the IS indications and the OOS indications newly received by the terminal device thereafter reaches 10 again, the terminal device updates the number of samples. Supposing that the number of the IS indications is 8, and the number of the OOS indications is 2, the updated number of the IS indications is 14, the updated number of the OOS indications is 6, and the ratio of the number of the IS indications to the number of OOS indications is 14/20>0.6, so the terminal device may stop the timer T310.

Optionally, determining, by the terminal device, whether to stop the timer T310 according to the proportional relation between the IS indication and the OOS indication received after the timer T310 is started, includes: determining, by the terminal device, whether to stop the timer T310 in each of time periods T2, according to the proportional relation between the IS indication and the OOS indication received in each of the time periods T2.

Specifically, the terminal device may periodically determine whether to stop the timer T310. The terminal device may divide the period according to a time duration. For example, each time duration T2 is used as a determining period. In each period T2, the terminal device needs to count the IS indications and the OOS indications received in the period, and determines whether to stop the timer T310 according to the proportional relation between the number of the IS indications and the number of the OOS indications in the period. That is to say, if the terminal device determines not to stop the timer T310 in the previous period to the current period, the samples used by the terminal device to determine whether to stop the timer T310 in the current period are the samples counted in the current period. It can also be understood that the terminal device clears the samples counted in the previous period and re-counts the samples.

For example, it is assumed that the proportional relation between the IS indication and the OOS indication is the ratio between the number of the IS indications and the number of the OOS indications, and the terminal device stops the timer T310 when the ratio exceeds 2. If the number of the IS indications received by a higher layer of the terminal device reported from a physical layer thereof at the end of a first period is 6, and the number of the OOS indications received is 4, since 6/4<2, the timer T310 is not stopped. At this time, the terminal device may clear the recorded numbers of the IS indications and the OOS indications. If the number of the IS indications received by the higher layer of the terminal device reported from the physical layer in a next second period is 8, and the number of the OOS indications is 2, the terminal device determines whether to stop the timer T310 according to the number 8 of the IS indications received in the second period and the number 2 of the OSS indications received in the second period. Since 8/2>2, the terminal device may stop the timer T310.

Optionally, determining, by the terminal device, whether to stop the timer T310 according to the proportional relation between the IS indication and the OOS indication received after the timer T310 is started, includes: determining, by the terminal device, whether to stop the timer T310 according to the proportional relation between the IS indication and the OOS indication in a number of N of the IS indications and the OSS indications newly received, every time the number of N of the IS indications and the OOS indications are received newly, wherein N is a positive integer.

Specifically, the terminal device may periodically determine whether to stop the timer T310. The terminal device may divide the period according to the number of samples (for example, the total number of the IS indications and the OOS indications). For example, every N samples are used as a determining period. When every N samples are received, the terminal device determines the respective numbers of the IS indications and the OSS indications in the N samples received this time, and determines whether to stop the timer T310 according to the proportional relation between the IS indication and the OOS indication in the N samples. In other words, if the terminal device determines not to stop the timer T310 according to the N samples received last time, the terminal device may determine whether to stop the timer T310 according to the N samples newly received this time, without considering the N samples received last time.

It should be understood that the number of samples herein may be the total number of the IS indications and the OOS indications, or the number of the IS indications, or the number of the OOS indications. Herein, only that the number of samples is the total number of the IS indications and the OOS indications is taken as an example for description, but the present application is not limited thereto.

For example, it is assumed that the proportional relation between the IS indication and the OOS indication is the ratio between the number of the IS indications and the total number of the IS indications and the OOS indications, the terminal device stops the timer T310 when the ratio exceeds 0.6, and N=10. If the number of the IS indications and the OOS indications received by the higher layer of the terminal device reported from the physical layer thereof reaches 10, the terminal device determines whether to stop the timer T310. If there are 2 IS indications and 8 OOS indications in these 10 samples, since 2/10<0.6, the terminal device does not stop the timer T310. Next, the higher layer of the terminal device continues to receive the IS indications and the OOS indications reported by the physical layer until the number of the newly received IS indications and OOS indications reaches 10, and then the terminal device determines whether to stop the timer T310 again. If there are 10 IS indications and 0 OOS indications in these 10 samples, since 10/10>0.6, the terminal device may stop the timer T310.

Optionally, determining, by the terminal device, whether to stop the timer T310 according to the proportional relation between the IS indication and the OOS indication received after the timer T310 is started, includes: determining, by the terminal device, a sliding window; and determining, by the terminal device, whether to stop the timer T310 according to the proportional relation between the IS indication and the OOS indication received in the sliding window.

Optionally, the sliding window includes the IS indication and the OOS indication received the most recent K times, or the sliding window includes the IS indication and the OOS indication received within the most recent time length T3, and K is a positive integer.

In the embodiment, the terminal device may determine whether to stop the timer T310 based on one sliding window, and the sliding window may include the IS indication and the OOS indication received the most recent K times, or include the IS indication and the OOS indication received within the most recent time length T3. Each time the sliding window slides to a position, the terminal device determines whether to stop the timer T310 according to the samples in the sliding window of the current position.

The length of the sliding window is fixed, and may be reflected by a time duration or the number of samples.

For example, the samples each time used by the terminal device to determine whether to stop the timer T310 are the samples received within a fixed time duration (for example, 10 ms). Supposing that the number of the IS indications and the OOS indications received by the terminal device within 0 ms-10 ms is 8, the number of the IS indications is 5 and the number of the OOS indications is 3, the terminal device may determine whether to stop the timer T310 according to the number 5 of the IS indications and the number 3 of the OOS indications within 0 ms-10 ms.

If the terminal device determines not to stop the timer T310, the sliding window continues to slide, for example, to a next time position 2 ms-12 ms, and at this time, the terminal device counts the IS indications and the OOS indications received within the time range of 2 ms-12 ms. Supposing that the number of the IS indications is 8, and the number of the OOS indications is 3, the terminal device determines whether to stop the timer T310 according to the number 8 of the IS indications and the number 3 of the OOS indications within 2 ms-12 ms. It can be seen that within the time range of 10 ms-12 ms, the terminal device has received 3 IS indications but no OOS indications.

For another example, the number of samples each time used by the terminal device to determine whether to stop the timer T310 is fixed (for example, 10 samples). It is assumed that after the timer T310 is started, the terminal device determines whether to stop the timer T310 according to first 10 samples (sample 1 to sample 10) received. The terminal device determines whether to stop the timer T310 according to the ratio between the number of the IS indications and the number of the OOS indications in these 10 samples. If the terminal device determines not to stop the timer T310, the higher layer of the terminal device continues to receive the IS indication and the OOS indication sent by the physical layer. When the terminal device receives sample 11 and sample 12, the terminal device may determine whether to stop the timer T310 again. At this time, the terminal device determines whether to stop the timer T310 according to the ratio between the number of the IS indications and the number of the OOS indications in the 10 samples from the sample 2 to the sample 12. In other words, the number of samples used each time is the same, and the samples used each time and the samples used last time may be partially overlapped.

It should be understood that the number of samples may be the total number of the IS indications and the OOS indications, the number of the IS indications, or the number of the OOS indications. Herein, only that the number of samples is the total number of the IS indications and the OOS indications is taken as an example for description, but the present application is not limited thereto.

Optionally, when or after the timer T310 is started by the terminal device, the method further includes starting a first timer by the terminal device, and determining, by the terminal device, whether to stop the timer T310 according to the proportional relation between the IS indication and the OOS indication received after the timer T310 is started, includes: determining, by the terminal device, whether to stop the timer T310 according to the proportional relation between the IS indication and the OOS indication, when the first timer expires.

In the embodiment, when the terminal device starts the timer T310, or at a certain time after the timer T310 is started, the terminal device may start the first timer. When the first timer expires, the terminal device determines whether to stop the timer T310 according to the proportional relation between the IS indication and the OOS indication. Optionally, if the proportional relation between the IS indication and the OOS indication received by the terminal device satisfies the condition of stopping the timer T310 in the time duration between the start of the timer T310 and the end of the first timer, the terminal device determines to stop the timer; and if the condition of stopping the timer T310 is not satisfied, the terminal device may restart the first timer, and re-determine whether to stop the timer T310 according to the proportional relation between the IS indication and the OOS indication currently received, when the first timer expires.

Manner 2

Optionally, determining, by the terminal device, whether to stop the timer T310 according to the number of the IS indications received after the timer T310 is started in 220, includes: stopping the timer T310 by the terminal device, if the number of the IS indications reaches a sixth threshold.

In the embodiment, as long as the IS indication received by the terminal device reaches a certain number, the timer T310 may be stopped, otherwise, the timer T310 is not stopped. It should be understood that the IS indications received by the terminal device may be non-continuous IS indications.

Optionally, determining, by the terminal device, whether to stop the timer T310 according to the number of the IS indications received after the timer T310 is started, includes: determining, by the terminal device, whether to stop the timer T310 in each of time periods T2, according to the number of the IS indications received in each of the time periods T2.

Specifically, the terminal device may periodically determine whether to stop the timer T310. The terminal device may divide the period according to a time duration. For example, each time duration T2 is used as a determining period. In each period T2, the terminal device needs to count the IS indications received in the period, to determine whether to stop the timer T310. That is to say, if the terminal device determines not to stop the timer T310 in the previous period to the current period, the samples used by the terminal device to determine whether to stop the timer T310 in the current period are the samples counted in the current period. It can also be understood that the terminal device clears the samples counted in the previous period and re-counts the samples.

For example, it is assumed that the terminal device stops the timer T310 when the number of the IS indications exceeds 15. If the number of the IS indications received by a higher layer of the terminal device reported from a physical layer thereof at the end of a first period is 10, since 10<15, the terminal device does not stop the timer T310. At this time, the terminal device may clear the recorded numbers of the IS indications and the OOS indications. If the number of the IS indications received by the higher layer of the terminal device reported from the physical layer in a next second period is 16, since 16>15, the terminal device may stop the timer T310.

Optionally, determining, by the terminal device, whether to stop the timer T310 according to the number of the IS indications received after the timer T310 is started, includes: determining, by the terminal device, whether to stop the timer T310 according to the number of the IS indications in a number of N of the IS indications and the OSS indications newly received, every time the number of N of the IS indications and the OOS indications are received newly.

Specifically, the terminal device may periodically determine whether to stop the timer T310. The terminal device may divide the period according to the number of samples (for example, the total number of the IS indications and the OOS indications). For example, every N samples are used as a determining period. When every N samples are received, the terminal device determines the number of the IS indications in the N samples received this time, to determine whether to stop the timer T310. In other words, if the terminal device determines not to stop the timer T310 according to the N samples received last time, the terminal device may determine whether to stop the timer T310 according to the N samples newly received this time, without considering the N samples received last time.

It should be understood that the number of samples may be the total number of the IS indications and the OOS indications, or the number of the IS indications, or the number of the OOS indications. Herein, only that the number of samples is the total number of the IS indications and the OOS indications is taken as an example for description, but the present application is not limited thereto.

For example, it is assumed that the terminal device stops the timer T310 when the number of the IS indications exceeds 15, and N=20. If the number of the IS indications and the OOS indications received by the higher layer of the terminal device reported from the physical layer thereof reaches 20, the terminal device determines whether to stop the timer T310. If there are 12 IS indications and 8 OOS indications in these 20 samples, since 12<15, the terminal device does not stop the timer T310. Next, the higher layer of the terminal device continues to receive the IS indications and the OOS indications reported by the physical layer until the number of the received IS indications and OOS indications reaches 20, and then the terminal device determines whether to stop the timer T310 again according to the newly received 20 samples. If there are 18 IS indications and 2 OOS indications in these 20 samples, since 18>15, the terminal device may stop the timer T310.

Optionally, determining, by the terminal device, whether to stop the timer T310 according to the number of the IS indications received after the timer T310 is started, includes: determining, by the terminal device, a sliding window; and determining, by the terminal device, whether to stop the timer T310 according to the number of the IS indications received in the sliding window.

Optionally, the sliding window includes the IS indication and the OOS indication received the most recent K times, or the sliding window includes the IS indication and the OOS indication received within the most recent time length T3, and K is a positive integer.

In the embodiment, the terminal device may determine whether to stop the timer T310 based on one sliding window, and the sliding window may include the IS indication and the OOS indication received the most recent K times, or include the IS indication and the OOS indication received within the most recent time length T3. Each time the sliding window slides to a position, the terminal device determines whether to stop the timer T310 according to the samples in the sliding window of the current position.

The length of the sliding window is fixed, and may be reflected by a time duration or the number of samples.

For example, the samples each time used by the terminal device to determine whether to stop the timer T310 are the samples received within a fixed time duration (for example, 10 ms). Supposing that the number of the IS indications received by the terminal device within 0 ms-10 ms is 5, the terminal device may determine whether to stop the timer T310 according to the number 5 of the IS indications within 0 ms-10 ms.

If the terminal device determines not to stop the timer T310, the sliding window continues to slide, for example, to a next time position 2 ms-12 ms, and at this time, the terminal device counts the IS indications received within the time range of 2 ms-12 ms. Supposing that the number of the IS indications is 8, the terminal device determines whether to stop the timer T310 according to the number 8 of the IS indications within 2 ms-12 ms.

For another example, the number of samples each time used by the terminal device to determine whether to stop the timer T310 is fixed (for example, 10 samples). It is assumed that after the timer T310 is started, the terminal device determines whether to stop the timer T310 according to the number of the IS indications in the first 10 samples (sample 1 to sample 10) received. If the terminal device determines not to stop the timer T310, the higher layer of the terminal device continues to receive the IS indication and the OOS indication sent by the physical layer. When the terminal device receives sample 11 and sample 12, the terminal device may determine whether to stop the timer T310 again. At this time, the terminal device determines whether to stop the timer T310 according to the number of the IS indications in the 10 samples from the sample 2 to the sample 12. In other words, the number of samples used each time is the same, and the samples used each time and the samples used last time may be partially overlapped.

It should be understood that the number of samples may be the total number of the IS indications and the OOS indications, the number of the IS indications, or the number of the OOS indications. Herein, only that the number of samples is the total number of the IS indications and the OOS indications is taken as an example for description, but the present application is not limited thereto.

Optionally, when or after the timer T310 is started by the terminal device, the method further includes starting a second timer by the terminal device, and determining, by the terminal device, whether to stop the timer T310 according to the number of the IS indications received after the timer T310 is started, includes: determining, by the terminal device, stopping the timer T310 before the second timer expires, if the number of the IS indications reaches the six threshold.

In the embodiment, when the terminal device starts the timer T310, or at a certain time after the timer T310 is started, the terminal device may start the first timer. When the first timer expires, the terminal device determines whether to stop the timer T310 according to the number of the IS indications. Optionally, if the number of the IS indications received by the terminal device is greater than the six threshold in the time duration between the start of the timer T310 and the end of the first timer, the terminal device determines to stop the timer T310; and if the number of the IS indications is less than the six threshold, the terminal device may restart the first timer, and re-determine whether to stop the timer T310 according to the number of the IS indications currently received, when the first timer expires.

It can be seen from the above manners 1 and 2 that, in the embodiment of the present application, the higher layer of the terminal device may determine whether to stop the timer T310 before the timer T310 expires, according to the number of the IS indications received or according to the proportional relation between the number of the IS indications and the number of the OOS indications, so as to stop the timer T310 under an appropriate condition to avoid a misjudgment of an RLF caused by an excessive number of the OSS indications due to a busy channel and thus failure to send RLM-RS.

Optionally, the method further includes: sending, by the network device, configuration information to the terminal device.

Correspondingly, the terminal device receives the configuration information sent by the network device.

Alternatively, the terminal device may acquire the configuration information pre-stored in the terminal device, for example, the configuration information may be pre-arranged by a protocol.

The configuration information includes at least one of: the first threshold, the second threshold, the third threshold, the fourth threshold, the fifth threshold, the sixth threshold, information of the first timer, and information of the second timer.

Optionally, sending, by the network device, the configuration information to the terminal device, includes: sending, by the network device, the configuration information to the terminal device through a broadcast message (for example, a physical broadcast channel (PBCH)), a system message (for example, remaining system information (RMSI), other system information (OSI) or the like), radio resource control (RRC) signaling, and a multiple access channel control element (MAC CE).

Correspondingly, the terminal device receives the configuration information sent by the network device through at least one of the broadcast message, the system message, the RRC signaling, and the MAC CE.

Optionally, the method further includes: measuring, by the terminal device, a measurement quantity that can reflect a link quality; reporting, by a physical layer of the terminal device, the IS indication to a higher layer of the terminal device, if a measured value of the measurement quantity is greater than or equal to a seventh threshold; and reporting, by the physical layer of the terminal device, the OOS indication to the higher layer of the terminal device, if the measured value of the measurement quantity is less than or equal to an eighth threshold.

For example, the measurement quantity may be a signal to interference plus noise ratio (SINR), a reference signal receiving power (RSRP), a reference signal receiving quality (RSRQ), a reference signal SINR (RS-SINR), or a RSSI. These measurement values may directly or indirectly characterize the channel quality or link quality of the terminal device. For example, when the measurement quantity is the SINR, the seventh threshold may be the in-sync threshold Qin, and the eighth threshold may be the out-of-sync threshold Qout.

Optionally, the method further includes: measuring, by the terminal device, a measurement quantity that can reflect a link quality; reporting, by a physical layer of the terminal device, the IS indication to a higher layer of the terminal device, if a measured value of the measurement quantity is less than or equal to a seventh threshold; and reporting, by the physical layer of the terminal device, the OOS indication to the higher layer of the terminal device, if the measured value of the measurement quantity is greater than or equal to an eighth threshold.

The measurement quantity may be, for example, a block error rate (BLER) or a received signal strength indication (RSSI).

Optionally, the method further includes: stopping the timer T310 by the terminal device before the timer T310 expires, if the number of the IS indications continuously received reaches a second number N311.

That is, if the timer T310 is not stopped based on the above manners 1 and 2, the terminal device may also stop the timer T310 before the timer T310 expires, if the number of the IS indications received continuously reaches the second number N311.

FIG. 3 is a schematic flowchart of a method 300 for wireless link monitoring according to an embodiment of the present application. The method described in FIG. 3 may be executed by a terminal device, and the terminal device may be, for example, the terminal device 120 shown in FIG. 1. As shown in FIG. 3, the method 300 for wireless link monitoring may include some or all of the following steps:

at 310, starting, by a terminal device, a timer T310, when a number of out of sync (OOS) indications continuously received by the terminal device exceeds a first number N310; and at 320, determining, by the terminal device, whether a radio link failure (RLF) occurs when the timer T310 expires, according to a number of in sync (IS) indications received after the timer T310 is started or according to a proportional relation between the IS indication and the OOS indication received after the timer T310 is started.

Specifically, when the timer T310 expires (or is overtime), the terminal device may determine whether the end of the timer T310 at this time can indicate indicates that the RLF has occurred, according to the number of the IS indications and the number of the OOS indications counted within the time duration from the start to the end of the timer T310, and according to the number of the IS indications or a ratio between the number of the IS indications and the number of the OSS indications. If the terminal device determines that the end of the timer T310 does not mean that the RLF has occurred, according to the number of the IS indications or the proportion between the IS indication and the OOS indication, the terminal device may not execute a corresponding process after the RLF, that is, may not execute the corresponding process after the timer T310 expires. It should be understood that the corresponding process after the timer T310 expires may refer to related descriptions in the prior art, and for the sake of brevity, details thereof are not repeated herein.

The terminal device may determine whether the timer T310 may be stopped according to the proportion relation between the IS indication and the OOS indication, and may also determine whether the RLF occurs according to the number of the IS indications discontinuously received. The two manners are described below.

Manner 1

Optionally, determining, by the terminal device, whether the RLF occurs according to the proportional relation between the IS indication and the OOS indication received after the timer T310 is started in 320, includes:

determining, by the terminal device, that the RLF does not occur, if a ratio of the number of the IS indications to the number of the OOS indications is greater than or equal to a first threshold; and/or determining, by the terminal device, that the RLF does not occur, if a ratio of the number of the IS indications to a total number of the IS indications and the OOS indications is greater than or equal to a second threshold; and/or determining, by the terminal device, that the RLF does not occur, if a ratio of the number of the OOS indications to the number of the IS indications is less than or equal to a third threshold; and/or determining, by the terminal device, that the RLF does not occur, the timer T310, if a ratio of the number of the OOS indications to the total number of the IS indications and the OOS indications is less than or equal to a fourth threshold In the embodiment, the proportional relation between the IS indication and the OOS indication may be indicated by any of: the ratio of the number of the IS indications to the number of the OOS indications, the ratio of the number of the IS indications to the total number of the IS indications and the OOS indications, the ratio of the number of the OOS indications to the number of the IS indications, and the ratio of the number of the OOS indications to the total number of the IS indications and the OOS indications.

It can be seen that when the timer T310 expires, as long as the number of the IS indications received by the terminal device reaches a certain proportion, the terminal device may consider that the RLF has not occurred, otherwise, may consider that the RLF has occurred.

Manner 2

Optionally, determining, by the terminal device, whether the RLF occurs, according to the number of the IS indications received after the timer T310 is started in 320, includes: determining, by the terminal device, that the RLF does not occur, If the number of the IS indications reaches a sixth threshold.

In the embodiment, as long as the IS indications received by the terminal device reach a certain number, it may be considered that the RLF has not occurred, otherwise, it may be considered that the RLF has occurred. It should be understood that the IS indications received by the terminal device may be non-continuous IS indications.

Therefore, in the embodiment, when the timer T310 expires, a higher layer of the terminal device may determine whether the RLF occurs according to the number of the IS indications received, or the proportional relation between the number of IS indications and the number of OOS indications, thereby avoiding a misjudgment of the RLF caused by an excessive number of the OSS indications due to the busy channel and thus the failure to send the RLM-RS.

Optionally, the method further includes: sending, by the network device, configuration information to the terminal device.

Correspondingly, the terminal device receives the configuration information sent by the network device.

Alternatively, the terminal device may acquire the configuration information pre-stored in the terminal device, for example, the configuration information may be pre-arranged by a protocol.

The configuration information includes at least one of: the first threshold, the second threshold, the third threshold, and the fourth threshold.

Optionally, sending, by the network device, the configuration information to the terminal device, includes: sending, by the network device, the configuration information to the terminal device through a broadcast message (for example, PBCH), a system message (for example, RMSI, OSI or the like), RRC signaling, and a MAC CE.

Correspondingly, the terminal device receives the configuration information sent by the network device through at least one of the broadcast message, the system message, the RRC signaling, and the MAC CE.

Optionally, the method further includes: measuring, by the terminal device, a measurement quantity that can reflect a link quality; reporting, by a physical layer of the terminal device, the IS indication to a higher layer of the terminal device, if a measured value of the measurement quantity is greater than or equal to a seventh threshold; and reporting, by the physical layer of the terminal device, the OOS indication to the higher layer of the terminal device, if the measured value of the measurement quantity is less than or equal to an eighth threshold.

For example, the measurement quantity may be SINR, RSRP, RSRQ, RS-SINR, or RSSI. For example, when the measurement quantity is the SINR, the seventh threshold may be the in-sync threshold Qin, and the eighth threshold may be the out-of-sync threshold Qout.

Optionally, the method further includes: measuring, by the terminal device, a measurement quantity that can reflect a link quality; reporting, by a physical layer of the terminal device, the IS indication to a higher layer of the terminal device, if a measured value of the measurement quantity is less than or equal to a seventh threshold; and reporting, by the physical layer of the terminal device, the OOS indication to the higher layer of the terminal device, if the measured value of the measurement quantity is greater than or equal to an eighth threshold.

The measurement quantity may be, for example, BLER or RSSI.

It should be understood that the names of the in-sync threshold Qin, the out-of-sync threshold Qout, the timer T310, the first number N310, and the second number N311 are not limited in the embodiment of the present application. Parameters with other names that can implement the functions of the above parameters also fall within the protection scope of the embodiments of the present application.

It should also be understood that in the embodiment of the present application, that "the terminal device reports the IS indication and/or the OOS indication" may refer to that "the physical layer of the terminal device reports the IS indication and/or the OOS indication to the higher layer of the terminal device"; and that "the terminal device receives the IS indication and/or the OOS indication" may refer to "the higher layer of the terminal device receives the IS indication and/or the OOS indication reported by the physical layer of the terminal device".

The method in the embodiment of the present application may be applied to the above-mentioned RLM measurement, however the present application is not limited thereto. The method described in the embodiment of the present application may also be applied to other link detection and recovery processes. For example, in a link detection corresponding to beam, it may determine that a beam failure occurs X times. If X is less than or equal to a certain threshold, a terminal device determines that the current link re-enters a better state.

It should be noted that, under the premise with no conflict, various embodiments described in present application and/or technical features in each embodiment may be combined with each other arbitrarily, and the technical solutions obtained by the combination should also fall within the protection scope of the present application.

It should be understood that, in the various embodiments of the present application, the size of the sequence number of the above-mentioned process does not mean an execution order, and the execution order of each process should be determined by the function and internal logic thereof, and should not limit the implementation process of the embodiments of the present application.

The communication method according to the embodiment of the present application is described in detail above, and a device according to an embodiment of the present application will be described below in conjunction with FIG. 4 to FIG. 7. The technical features described in the method embodiment are applicable to the following device embodiments.

Figure 4:
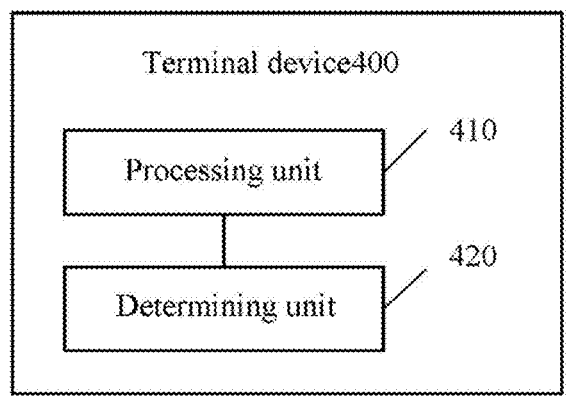
FIG. 4 is a schematic block diagram of a terminal device according to an embodiment of the present application.

FIG. 4 is a schematic block diagram of a terminal device 400 according to an embodiment of the present application. As shown in FIG. 4, the terminal device 400 includes a processing unit 410 and a determining unit 420.

The processing unit 410 is configured to start a timer T410, when the terminal device determines that a number of out of sync (OOS) indications continuously received exceeds a first number N410.

The determining unit 420 is configured to determine whether to stop the timer T410 before the timer T410 expires, according to a number of in sync (IS) indications received after the timer T410 is started or according to a proportional relation between the IS indication and the OOS indication received after the timer T410 is started.

Therefore, after the timer T410 is started, the terminal device may determine whether to stop the timer T410 in advance according to the number of the received IS indications or the proportional relation between the IS indication and the OOS indication, so as to avoid, as much as possible, a misjudgment of RLF caused by that RLM-RS cannot be successfully sent due to a busy channel, thereby improving an accuracy of RLM measurement on unlicensed spectrum.

Optionally, the processing unit 410 is specifically configured to: stop the timer T310, if a ratio of the number of the IS indications to the number of the OOS indications is greater than or equal to a first threshold; and/or stop the timer T310, if a ratio of the number of the IS indications to a total number of the IS indications and the OOS indications is greater than or equal to a second threshold; and/or stop the timer T310, if a ratio of the number of the OOS indications to the number of the IS indications is less than or equal to a third threshold; and/or stop the timer T310, if a ratio of the number of the OOS indications to the total number of the IS indications and the OOS indications is less than or equal to a fourth threshold.

Optionally, the determining unit 420 is specifically configured to: determine whether the total number of the IS indications and the OOS indications reaches a fifth threshold; and determine whether to stop the timer T310 according to the proportional relation between the IS indication and the OOS indication, if the total number of the IS indications and the OOS indications reaches the fifth threshold.

Optionally, the determining unit 420 is specifically configured to: determine whether a running time of the timer T310 reaches a predetermined time duration; and determine, by the terminal device, whether to stop the timer T310 according to the proportional relation between the IS indication and the OOS indication, if the running time of the timer T310 reaches the predetermined time duration.

Optionally, the processing unit 410 is further configured to: update the number of the IS indications and the number of the OOS indications received after the timer T310 is started, based on a time duration, and determine whether to stop the timer T310 according to an updated proportional relation between the IS indication and the OOS indication.

Optionally, the processing unit 410 is specifically configured to update the number of the IS indications and the number of the OOS indications received after the timer T310 is started, every time a time duration T1 has passed.

Optionally, the processing unit 410 is further configured to: update the number of the IS indications and the number of the OOS indications received after the timer T310 is started, based on the IS indication and the OOS indication, and determine whether to stop the timer T310 according to an updated proportional relation between the IS indication and the OOS indication.

Optionally, the processing unit 410 is specifically configured to: update the numbers of the IS indications and the OOS indications received after the timer T310 is started, every time a number of M of the IS indications and the OOS indications are received newly, wherein M is a positive integer.

Optionally, the determining unit 420 is specifically configured to: determine whether to stop the timer T310 in each of time periods T2, according to the proportional relation between the IS indication and the OOS indication received in each of the time periods T2; or determine whether to stop the timer T310 according to the proportional relation between the IS indication and the OOS indication in a number of N of the IS indications and the OSS indications newly received, every time the number of N of the IS indications and the OOS indications are received newly, wherein N is a positive integer.

Optionally, the determining unit 420 is specifically configured to: determine a sliding window, wherein the sliding window includes the IS indication and the OOS indication received the most recent K times, or the sliding window includes the IS indication and the OOS indication received within the most recent time length T3, and K is a positive integer; and determine whether to stop the timer T310 according to the proportional relation between the IS indication and the OOS indication received in the sliding window.

Optionally, when or after the timer T310 is started by the terminal device, the processing unit 410 is further configured to: start a first timer; and wherein the determining unit 420 is specifically configured to: determine whether to stop the timer T310 according to the proportional relation between the IS indication and the OOS indication, when the first timer expires.

Optionally, the processing unit 410 is specifically configured to: stop the timer T310, if the number of the IS indications reaches a sixth threshold.

Optionally, the determining unit 420 is specifically configured to: determine whether to stop the timer T310 in each of time periods T2, according to the number of the IS indications received in each of the time periods T2; or determine whether to stop the timer T310 according to the number of the IS indications in a number of N of the IS indications and the OSS indications newly received, every time the number of N of the IS indications and the OOS indications are received newly.

Optionally, the determining unit 420 is specifically configured to: determine a sliding window, wherein the sliding window includes the IS indication and the OOS indication received the most recent K times, or the sliding window includes the IS indication and the OOS indication received within the most recent time length T3, and K is a positive integer; and determine whether to stop the timer T310 according to the number of the IS indications received in the sliding window.

Optionally, when or after the timer T310 is started by the terminal device, the processing unit 410 is further configured to: start a second timer; and the determining unit is specifically configured to: determine, by the terminal device, stopping the timer T310 before the second timer expires, if the number of the IS indications reaches the six threshold.

Optionally, the terminal device further includes a receiving unit and an acquiring unit, wherein: the receiving unit is configured to receive configuration information sent by a network device; the acquiring unit is configured to acquire the configuration information pre-stored in the terminal device, and wherein the configuration information includes at least one of: the first threshold, the second threshold, the third threshold, the fourth threshold, the fifth threshold, the sixth threshold, information of the first timer, and information of the second timer.

Optionally, the receiving unit is specifically configured to: receive the configuration information sent by the network device through at least one of a broadcast message, a system message, radio resource control (RRC) signaling, and a multiple access channel control element (MAC CE).

Optionally, the terminal device further includes a measuring unit and a sending unit, wherein: the measuring unit is configured to measure a measurement quantity that can reflect a link quality; and the sending unit is configured to report the IS indication from a physical layer to a higher layer, if a measured value of the measurement quantity is greater than or equal to a seventh threshold; and report the OOS indication from the physical layer to the higher layer, if the measured value of the measurement quantity is less than or equal to an eighth threshold.

Optionally, the measurement quantity includes any one of: a signal to interference plus noise ratio (SINR), a reference signal receiving power (RSRP), a reference signal receiving quality (RSRQ), RSSI and a reference signal SINR (RS-SINR).

Optionally, the terminal device further includes a measuring unit and a sending unit, wherein: the measuring unit is configured to measure a measurement quantity that can reflect a link quality; and the sending unit is configured to report the IS indication from a physical layer to a higher layer, if a measured value of the measurement quantity is less than or equal to a ninth threshold; and report the OOS indication from the physical layer to the higher layer, if the measured value of the measurement quantity is greater than or equal to a tenth threshold.

Optionally, the measurement quantity includes a block error rate (BLER) or a received signal strength indication (RSSI).

Optionally, the processing unit 410 is further configured to: stop the timer T310 before the timer T310 expires, if the number of the IS indications continuously received reaches a second number N311.

It should be understood that the terminal device 400 may perform the corresponding operations performed by the terminal device in the foregoing method 200, and for the sake of brevity, details thereof are not repeated herein.

Figure 5:
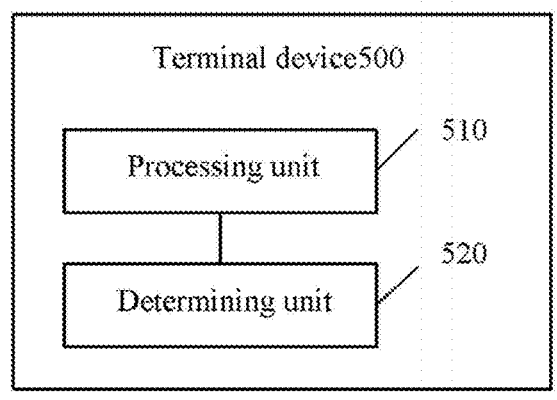
FIG. 5 is a schematic block diagram of a terminal device according to another embodiment of the present application.

FIG. 5 is a schematic block diagram of a terminal device 500 according to an embodiment of the present application. As shown in FIG. 5, the terminal device 4500 includes a processing unit 510 and a determining unit 520.

The processing unit 510 is configured to start a timer T310, when a number of out of sync (OOS) indications continuously received by the terminal device exceeds a first number N310.

The determining unit 520 is configured to determine whether a radio link failure (RLF) occurs when the timer T310 expires, according to a number of in sync (IS) indications received after the timer T310 is started or according to a proportional relation between the IS indication and the OOS indication received after the timer T310 is started.

Therefore, after the timer T310 is started, the higher layer of the terminal device may determine whether the RLF occurs according to the number of the received IS indications or the proportional relation between the number of the IS indications and the number of the OOS indications, so as to avoid, as much as possible, a misjudgment of the RLF caused by that RLM-RS cannot be successfully sent due to a busy channel, thereby improving an accuracy of RLM measurement on unlicensed spectrum.

Optionally, the determining unit 520 is specifically configured to: determine that the RLF does not occur, if a ratio of the number of the IS indications to the number of the OOS indications is greater than or equal to a first threshold; and/or determine that the RLF does not occur, if a ratio of the number of the IS indications to a total number of the IS indications and the OOS indications is greater than or equal to a second threshold; and/or determine that the RLF does not occur, if a ratio of the number of the OOS indications to the number of the IS indications is less than or equal to a third threshold; and/or determine that the RLF does not occur, the timer T310, if a ratio of the number of the OOS indications to the total number of the IS indications and the OOS indications is less than or equal to a fourth threshold.

Optionally, the determining unit 520 is specifically configured to: determine, by the terminal device, that the RLF does not occur, If the number of the IS indications reaches a sixth threshold.

It should be understood that the terminal device 500 may perform the corresponding operations performed by the terminal device in the foregoing method 300, and for the sake of brevity, details thereof are not described herein again.

Figure 6:
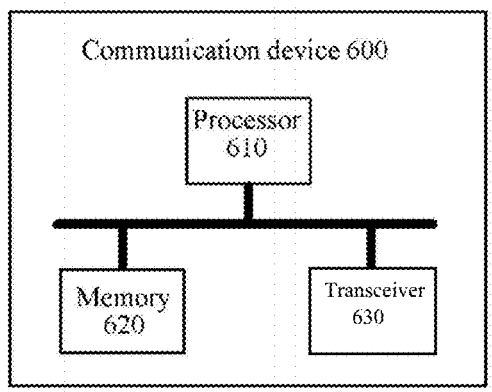
FIG. 6 is a schematic structural diagram of a communication device according to an embodiment of the present application.

FIG. 6 is a schematic structural diagram of a communication device 600 according to an embodiment of the present application. The communication device 600 shown in FIG. 6 includes a processor 610, and the processor 610 may call and run computer programs from a memory to implement the method in the embodiment of the present application.

Optionally, as shown in FIG. 6, the communication device 600 may further include a memory 620. The processor 610 may call and run the computer programs from the memory 620 to implement the method in the embodiment of the present application.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with other devices. Specifically, the transceiver 630 may send information or data to other devices, or receive information or data from other devices.

The transceiver 630 may include a transmitter and a receiver. The transceiver 630 may further include an antenna, and the number of antennas may be one or more.

Optionally, the communication device 600 may specifically be the terminal device in the embodiment of the present application, and the communication device 600 may implement the corresponding process implemented by the terminal device in each method of the embodiment of the present application. For brevity, details thereof are not repeated herein.

Optionally, the communication device 600 may specifically be the network device in the embodiment of the present application, and the communication device 600 may implement the corresponding process implemented by the network device in each method of the embodiment of the present application. For brevity, details thereof are not repeated herein.

Figure 7:
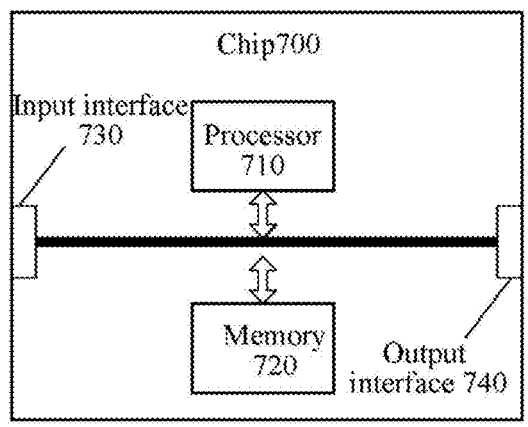
FIG. 7 is a schematic structural diagram of a chip according to an embodiment of the present application.

FIG. 7 is a schematic structural diagram of a chip according to an embodiment of the present application. The chip 700 shown in FIG. 7 includes a processor 710, and the processor 710 may call and run computer programs from a memory to implement the method according to the embodiment of the present application.

Optionally, as shown in FIG. 7, the chip 700 may further include a memory 720. The processor 710 may call and run the computer programs from the memory 720 to implement the method according to the embodiment of the present application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the terminal device in the embodiment of the present application, and the chip may implement the corresponding process implemented by the terminal device in each method of the embodiment of the present application. For the sake of brevity, details thereof are not repeated herein again.

Optionally, the chip may be applied to the network device in the embodiment of the present application, and the chip may implement the corresponding process implemented by the network device in each method of the embodiment of the present application. For the sake of brevity, details thereof are not repeated herein.

It should be understood that the chip mentioned in the embodiment of the present application may also be referred to as a system-level chip, a system chip, a chip system, a system-on-chip and the like.

It should be understood that the processor of the embodiment of the present application may be an integrated circuit chip with signal processing capability. In the implementation process, the steps of the foregoing method embodiment can be completed by a hardware integrated logic circuit in the processor or instructions in the form of software. The aforementioned processor can be a general-purpose processor, a digital signal processor (DSP), an application specific integrated circuit (ASIC), a field-programmable gate array (FPGA) or other programmable logic devices, a discrete gate or transistor logic device, a discrete hardware component. The methods, steps, and logical block diagrams disclosed in the embodiments of the present application can be implemented or executed. The general-purpose processor may be a microprocessor or the processor may be any conventional processor or the like. The steps of the method disclosed in combination with the embodiments of the present application may be directly embodied as being executed and completed by a hardware decoding processor, or by a combination of hardware and software modules in the decoding processor. The software module can be located in a mature storage medium in the field such as random access memory, flash memory, read-only memory, programmable read-only memory, or electrically erasable programmable memory, register. The storage medium is located in the memory, and the processor reads the information in the memory and completes the steps of the above method in combination with the hardware thereof.

It can be understood that the memory in the embodiment of the present application may be volatile memory or non-volatile memory, or may include both volatile and non-volatile memories. The non-volatile memory may be read-only memory (ROM), programmable read-only memory (PROM), erasable programmable read-only memory (EPROM), electrically erasable programmable read-only memory (EEPROM) or flash memory. The volatile memory may be a random access memory (RAM), which is used as an external cache. For example, many forms of RAMs are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchlink dynamic random access memory (SLDRAM) and direct rambus random access memory (DR RAM), however the present application is not limited thereto. It should be noted that the memory of the system and method described herein is intended to include, but is not limited to, these and any other suitable types of memories.

It should be understood that the foregoing memory is exemplary but not restrictive. For example, the memory in the embodiment of the present application may also be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synch link dynamic random access memory (SLDRAM), direct rambus random access memory (DR RAM) and the like. That is to say, the memory in the embodiment of the present application is intended to include but is not limited to these and any other suitable types of memories.

An embodiment of the present application also provides a computer-readable storage medium for storing computer programs. Optionally, the computer-readable storage medium may be applied to the terminal device in the embodiment of the present application, and the computer programs cause a computer to execute the corresponding processes implemented by the terminal device in each method of the embodiment of the present application, which would not be repeated herein for brevity. Optionally, the computer-readable storage medium may be applied to the network device in the embodiment of the present application, and the computer programs cause a computer to execute the corresponding processes implemented by the network device in each method of the embodiment of the present application, which would not be repeated herein for brevity.

An embodiment of the present application also provides a computer program product including a computer program instruction. Optionally, the computer program product can be applied to the terminal device in the embodiment of the present application, and the computer program instruction causes a computer to execute the corresponding processes implemented by the terminal device in each method of the embodiment of the present application, which would not be repeated herein for brevity. Optionally, the computer program product can be applied to the network device in the embodiment of the present application, and the computer program instruction causes a computer to execute the corresponding processes implemented by the network device in each method of the embodiment of the present application, which would not be repeated herein for brevity.

An embodiment of the application also provides a computer program. Optionally, the computer program can be applied to the network device in the embodiment of the present application, and when the computer program runs on a computer, it causes the computer to execute the corresponding processes implemented by the network device in each method of the embodiment of the present application, which would not be repeated herein for brevity. Optionally, the computer program can be applied to the terminal device in the embodiment of the present application, and when the computer program runs on a computer, it causes the computer to execute the corresponding processes implemented by the terminal device in each method of the embodiment of the present application, which would not be repeated herein for brevity.

It should be understood that the terms "system" and "network" herein are often used interchangeably. The term "and/or" herein is only an association relationship that describes associated objects, which means that there may be three relationships, for example, A and/or B may mean three situations of only A, both A and B, and only B. In addition, the character "/" herein generally indicates that associated objects before and after it have an "or" relationship.

It should also be understood that in the embodiment of the present invention, "B corresponding to A" means that B is associated with A, and B may be determined according to A. However, it should also be understood that B is determined according to A does not mean that B is determined only according to A, and B may also be determined according to A and/or other information.

Those skilled in the art may realize that units and algorithm steps of various examples described in connection with the embodiments disclosed herein can be implemented by electronic hardware, or a combination of computer software and electronic hardware. Whether these functions are performed in hardware or software depends on a specific application and a design constraint of the technical solution. Professional technicians can use different methods to implement the described functions for each specific application, but such implementation should not be considered to be beyond the scope of the present application.

Those skilled in the art can clearly understand that for the convenience and brief description, specific working processes of the systems, devices, and units described above can refer to corresponding processes in the foregoing method embodiments, and are not repeated herein.

In several embodiments provided in the present application, it should be understood that the disclosed systems, devices, and methods may be implemented in other ways. For example, the device embodiments described above are only schematic. For example, the division of units is only a logical function division. In actual implementation, there may be another division manner. For example, multiple units or components may be combined or integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

Units described as separate components may be or may not be physically separated, and components shown as units may be or may not be physical units, which may be located in one place, or may be distributed on multiple network units. Some or all of the units may be selected according to actual needs to achieve the object of the embodiments.

In addition, various functional units in the embodiments of the present application may be integrated into one processing unit, or each unit may physically exist separately, or two or more units may be integrated into one unit.

If the described function is implemented in the form of a software functional unit and sold or used as an independent product, it may be stored in a computer-readable storage medium. Based on such understanding, the part or the part of the technical solution, that the essence of the technical solution of the present application is or that contributes to the prior art, may be embodied in the form of a software product, which is stored in a storage medium. The storage medium includes a plurality of instructions, so that a computer device (which may be a personal computer, a server, or a network device, etc.) may perform all or part of the steps of the method described in the embodiments of the present disclosure. The foregoing storage medium includes various media that can store program codes, such as a U disk, a mobile hard disk, a read-only memory ROM, a random access memory (RAM), a magnetic disk, or an optical disk.

The above are only specific implementations of t the present application, and the protection scope of the present application is not limited thereto. Any person skilled in the art can easily conceive of modifications and substitutes within the technical scope disclosed by the embodiments of the present application. Such modifications and substitutes are within the protection scope of the present application. Therefore, the protection scope of the present application shall be subject to the protection scope of the claims.

What is claimed is:

1. A method for wireless link monitoring (RLM), wherein the method comprises:
   starting, by a terminal device, a timer T310, when a number of out of sync (OOS) indications continuously received by the terminal device exceeds a first number N310; and
   determining, by the terminal device, whether to stop the timer T310 before the timer T310 expires, according to a number of in sync (IS) indications received after the timer T310 is started or according to a proportional relation between the IS indication and the OOS indication received after the timer T310 is started,
   wherein the method further comprises:
      stopping, by the terminal device, the timer T310, if a ratio of the number of the IS indications to the number of the OOS indications is greater than or equal to a first threshold; and/or
      stopping, by the terminal device, the timer T310, if a ratio of the number of the IS indications to a total number of the IS indications and the OOS indications is greater than or equal to a second threshold; and/or
      stopping, by the terminal device, the timer T310, if a ratio of the number of the OOS indications to the number of the IS indications is less than or equal to a third threshold; and/or
      stopping, by the terminal device, the timer T310, if a ratio of the number of the OOS indications to the total number of the IS indications and the OOS indications is less than or equal to a fourth threshold, wherein the method further comprises:

determining, by the terminal device, whether a radio link failure (RLF) occurs when the timer T310 expires, according to the number of the in sync (IS) indications received after the timer T310 is started or according to the proportional relation between the IS indication and the OOS indication received after the timer T310 is started.

2. The method according to claim 1, wherein determining, by the terminal device, whether to stop the timer T310 according to the proportional relation between the IS indication and the OOS indication received after the timer T310 is started, comprises:

determining, by the terminal device, whether the total number of the IS indications and the OOS indications reaches a fifth threshold; and determining, by the terminal device, whether to stop the timer T310 according to the proportional relation between the IS indication and the OOS indication, if the total number of the IS indications and the OOS indications reaches the fifth threshold.

3. The method according to claim 1, wherein determining, by the terminal device, whether to stop the timer T310 according to the proportional relation between the IS indication and the OOS indication received after the timer T310 is started, comprises:

determining, by the terminal device, whether a running time of the timer T310 reaches a predetermined time duration; and determining, by the terminal device, whether to stop the timer T310 according to the proportional relation between the IS indication and the OOS indication, If the running time of the timer T310 reaches the predetermined time duration.

4. The method according to claim 1, wherein the method further comprises:

updating, by the terminal device, the number of the IS indications and the number of the OOS indications received after the timer T310 is started, based on a time duration, and determining whether to stop the timer T310 according to an updated proportional relation between the IS indication and the OOS indication, wherein updating, by the terminal device, the number of the IS indications and the number of the OOS indications received after the timer T310 is started, based on the time duration, comprises:

updating, by terminal device, the number of the IS indications and the number of the OOS indications received after the timer T310 is started, every time a time duration T1 has passed.

5. The method according to claim 1, wherein the method further comprises:

updating, by the terminal device, the number of the IS indications and the number of the OOS indications received after the timer T310 is started, based on the IS indication and the OOS indication, and determining whether to stop the timer T310 according to an updated proportional relation between the IS indication and the OOS indication, wherein updating, by the terminal device, the number of the IS indications and the number of the OOS indications received after the timer T310 is started, based on the IS indication and the OOS indication, comprises:

updating, by the terminal device, the numbers of the IS indications and the OOS indications received after the timer T310 is started, every time a number of M of the IS indications and the OOS indications are received newly, wherein M is a positive integer.

6. The method according to claim 1, wherein determining, by the terminal device, whether to stop the timer T310 according to the proportional relation between the IS indication and the OOS indication received after the timer T310 is started, comprises:

determining, by the terminal device, whether to stop the timer T310 in each of time periods T2, according to the proportional relation between the IS indication and the OOS indication received in each of the time periods T2; or determining, by the terminal device, whether to stop the timer T310 according to the proportional relation between the IS indication and the OOS indication in a number of N of the IS indications and the OOS indications newly received, every time the number of N of the IS indications and the OOS indications are received newly, wherein N is a positive integer.

7. The method according to claim 1, wherein determining, by the terminal device, whether to stop the timer T310 according to the proportional relation between the IS indication and the OOS indication received after the timer T310 is started, comprises:

determining, by the terminal device, a sliding window, wherein the sliding window comprises the IS indication and the OOS indication received the most recent K times, or the sliding window comprises the IS indication and the OOS indication received within the most recent time length T3, and K is a positive integer; and determining, by the terminal device, whether to stop the timer T310 according to the proportional relation between the IS indication and the OOS indication received in the sliding window.

8. The method according to claim 1, wherein when or after the timer T310 is started by the terminal device, the method further comprises:

starting a first timer by the terminal device, and wherein determining, by the terminal device, whether to stop the timer T310 according to the proportional relation between the IS indication and the OOS indication received after the timer T310 is started, comprises:

determining, by the terminal device, whether to stop the timer T310 according to the proportional relation between the IS indication and the OOS indication, when the first timer expires.

9. The method according to claim 1, wherein determining, by the terminal device, whether to stop the timer T310 according to the number of the IS indications received after the timer T310 is started, comprises:

stopping the timer T310 by the terminal device, if the number of the IS indications reaches a sixth threshold.

10. The method according to claim 9, wherein determining, by the terminal device, whether to stop the timer T310 according to the number of the IS indications received after the timer T310 is started, comprises:

determining, by the terminal device, whether to stop the timer T310 in each of time periods T2, according to the number of the IS indications received in each of the time periods T2; or determining, by the terminal device, whether to stop the timer T310 according to the number of the IS indications in a number of N of the IS indications and the OOS indications newly received, every time the number of N of the IS indications and the OOS indications are received newly, wherein N is a positive integer.

11. The method according to claim 9, wherein determining, by the terminal device, whether to stop the timer T310 according to the number of the IS indications received after the timer T310 is started, comprises:

determining, by the terminal device, a sliding window, wherein the sliding window comprises the IS indication and the OOS indication received the most recent K times, or the sliding window comprises the IS indication and the OOS indication received within the most recent time length T3, and K is a positive integer; and determining, by the terminal device, whether to stop the timer T310 according to the number of the IS indications received in the sliding window.

12. The method according to claim 9, wherein when or after the timer T310 is started by the terminal device, the method further comprises:

starting a second timer by the terminal device, and wherein determining, by the terminal device, whether to stop the timer T310 according to the number of the IS indications received after the timer T310 is started, comprises:

determining, by the terminal device, stopping the timer T310 before the second timer expires, if the number of the IS indications reaches the sixth threshold.

13. The method according to claim 1, wherein determining, by the terminal device, whether the RLF occurs according to the proportional relation between the IS indication and the OOS indication received after the timer T310 is started, comprises:

determining, by the terminal device, that the RLF does not occur, if a ratio of the number of the IS indications to the number of the OOS indications is greater than or equal to a first threshold; and/or determining, by the terminal device, that the RLF does not occur, if a ratio of the number of the IS indications to a total number of the IS indications and the OOS indications is greater than or equal to a second threshold; and/or determining, by the terminal device, that the RLF does not occur, if a ratio of the number of the OOS indications to the number of the IS indications is less than or equal to a third threshold; and/or determining, by the terminal device, that the RLF does not occur, the timer T310, if a ratio of the number of the OOS indications to the total number of the IS indications and the OOS indications is less than or equal to a fourth threshold.

14. A terminal device, wherein the terminal device comprises:

a memory, storing computer programs; and a processor, configured to call and run the computer programs stored in the memory to execute a method for wireless link monitoring (RLM), comprising:

starting, by a terminal device, a timer T310, when a number of out of sync (OOS) indications continuously received by the terminal device exceeds a first number N310; and determining, by the terminal device, whether to stop the timer T310 before the timer T310 expires, according to a number of in sync (IS) indications received after the timer T310 is started or according to a proportional relation between the IS indication and the OOS indication received after the timer T310 is started, wherein the method further comprises:

stopping, by the terminal device, the timer T310, if a ratio of the number of the IS indications to the number of the OOS indications is greater than or equal to a first threshold; and/or stopping, by the terminal device, the timer T310, if a ratio of the number of the IS indications to a total number of the IS indications and the OOS indications is greater than or equal to a second threshold; and/or stopping, by the terminal device, the timer T310, if a ratio of the number of the OOS indications to the number of the IS indications is less than or equal to a third threshold; and/or stopping, by the terminal device, the timer T310, if a ratio of the number of the OOS indications to the total number of the IS indications and the OOS indications is less than or equal to a fourth threshold, wherein the method further comprises:

determining, by the terminal device, whether a radio link failure (RLF) occurs when the timer T310 expires, according to the number of the in sync (IS) indications received after the timer T310 is started or according to the proportional relation between the IS indication and the OOS indication received after the timer T310 is started.

15. The terminal device according to claim 14, wherein determining, by the terminal device, whether to stop the timer T310 according to the proportional relation between the IS indication and the OOS indication received after the timer T310 is started, comprises:

determining, by the terminal device, whether the total number of the IS indications and the OOS indications reaches a fifth threshold; and determining, by the terminal device, whether to stop the timer T310 according to the proportional relation between the IS indication and the OOS indication, if the total number of the IS indications and the OOS indications reaches the fifth threshold.

16. The terminal device according to claim 14, wherein determining, by the terminal device, whether to stop the timer T310 according to the proportional relation between the IS indication and the OOS indication received after the timer T310 is started, comprises:

determining, by the terminal device, whether a running time of the timer T310 reaches a predetermined time duration; and determining, by the terminal device, whether to stop the timer T310 according to the proportional relation between the IS indication and the OOS indication, If the running time of the timer T310 reaches the predetermined time duration.

\* \* \* \* \*